Patented Feb. 20, 1923.

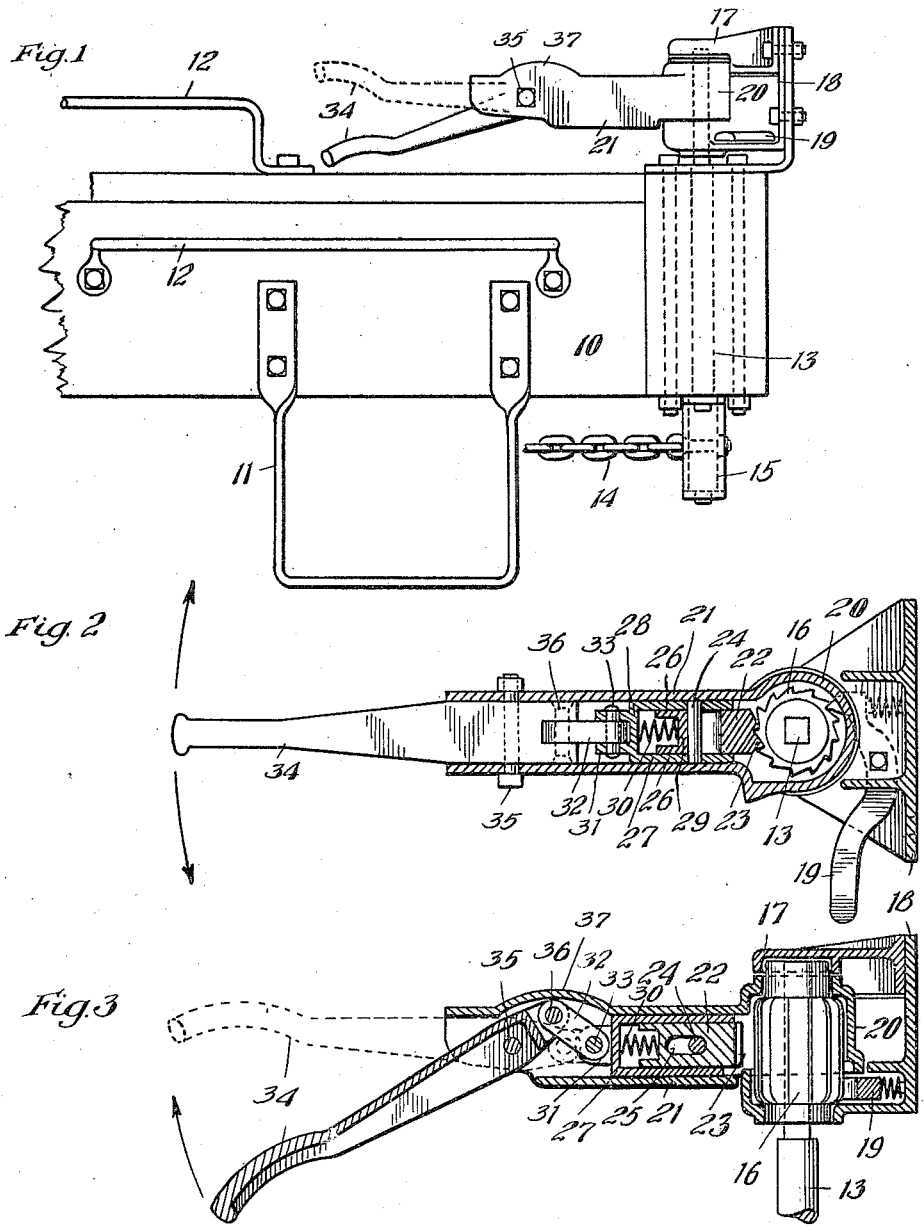

1,446,226

UNITED STATES PATENT OFFICE.

FREDERICK B. TOWNSEND, OF CHICAGO, ILLINOIS, ASSIGNOR TO WILLIAM H. MINER, OF CHAZY, NEW YORK.

HAND BRAKE FOR RAILWAY CARS.

Application filed June 12, 1919. Serial No. 303,736.

*To all whom it may concern:*

Be it known that I, FREDERICK B. TOWNSEND, a citizen of the United States, residing at Chicago, in the county of Cook and State of Illinois, have invented a certain new and useful Improvement in Hand Brakes for Railway Cars, of which the following is a full, clear, concise, and exact description, reference being had to the accompanying drawings, forming a part of this specification.

My invention relates to improvements in hand brakes for railway cars.

One of the objects of my invention is to provide a simple and efficient hand brake having a drop handle. The other objects will appear from the description of the invention hereinafter following.

In the drawings forming a part of this specification, Figure 1 illustrates my invention applied to a railroad car, only a small portion of said car being shown. Figure 2 is a horizontal section of a hand brake embodying my invention. Figure 3 is a vertical section thereof.

Referring to the drawings, the numeral 10 indicates a portion of the frame of a railroad car showing the foot iron 11 and the grab irons 12—12 connected thereto. 13 indicates a brake staff going through a portion of the car and provided with a brake chain 14 adapted to be wound upon the drum 15 of the staff. At its upper end, the staff is provided with a rotatable ratchet wheel 16 which is mounted within the casing 17, which is appropriately secured to the car—as, for instance, by the member 18. A spring-pressed holding pawl is indicated at 19. A hub 20 surrounds the ratchet 16 and is provided with a hollow sleeve 21, at the inner end of which is mounted the operating pawl 22 provided with the teeth 23 adapted to engage the rotatable wheel 16. The said pawl is adapted to slide within the sleeve, its longitudinal movement being limited by the pin 24 which passes through an elongated slot 25 in the operating pawl. The said pin has its ends secured in the side arms 26—26 of a pawl actuating member 27 between the outer end 28 of which, and the outer end 29 of the operating pawl, a spring 30 is mounted. The operating member 27 is outwardly provided with a pair of spaced-apart lugs 31 between which the end of a toggle 32 is received which is pivoted thereto by means of a pin 33. An operating handle 34 is pivoted within the sleeve at its outer end by means of the pin or bolt 35, and to the inner end of said handle, as at 36, is pivoted the toggle 32, the sleeve being at this point enlarged, as indicated at 37, to permit the operation of the toggle and handle end therein. The said handle is of the drop type and when in its raised position, as indicated by the dotted lines in Figure 1 and in Figure 3 of the drawings, the toggle is alined with the axis of the handle and of the pawl operating member, forcing the pawl operating member inwardly and through the spring 30, driving the operating pawl into engagement with the ratchet wheel. On moving the handle in one direction—as, for instance, contra-clockwise, as shown in Figure 2 of the drawings, the ratchet wheel is turned in the same direction turning the brake staff and winding up the chain until at the end of the handle stroke the operator may return the handle without dropping the same for further strokes, the ratchet upon each return being held against clockwise rotation by the holding pawl 19. On dropping the operating handle 34, the toggle draws the pawl operating member outwardly in the sleeve, withdrawing the operating pawl from its engagement with the ratchet. It will be observed that by the employment of the toggle a very short inner end for the operating handle may be employed, making the device simple and of a construction sufficiently small to not be cumbersome and of positive and efficient action.

I claim:

1. In a hand brake for railway cars, a combination with a brake staff having a ratchet and a hub having a sleeve, of an operating pawl mounted within the sleeve to slide transversely of the hub, an operating handle pivoted to said sleeve and a toggle connection including a spring cushion between said operating handle and the pawl.

2. In a hand brake, in combination, a ratchet wheel, a hub associated therewith, an operating pawl for the ratchet wheel, a guide extending transversely of the ratchet wheel for said pawl, an operating handle for the pawl and a toggle connection including a spring cushion between the operating handle and the pawl.

3. In a hand brake, in combination, a brake chain, a drum therefor, a ratchet associated with said drum, a hub rotatable about said ratchet, an operating sleeve extended laterally from the hub, an operating pawl within said sleeve, a handle pivoted to the sleeve and a toggle connection including a spring cushion between the operating handle and the operating pawl.

4. In a hand brake, in combination, a vertically extending staff having a ratchet wheel rotatable in unison therewith, a horizontally slidable operating pawl cooperable with said ratchet wheel, means for supporting said pawl, and means for engaging the said pawl with, and disengaging it from, the ratchet, said means including a pivoted lever adapted to drop to an inoperative position under the influence of gravity and a toggle between said lever and the operating pawl, the latter being withdrawn from operative position when the lever drops.

5. In a hand brake for railway cars and the like, the combination with a vertically extending staff having a ratchet wheel rotatable in unison therewith, of a hub rotatably mounted with respect to said staff and ratchet wheel, an operating handle pivotally mounted on said hub, a pawl-actuating member slidably mounted on said hub; a toggle interposed between said handle and member; a pawl slidably mounted within said pawl-actuating member and adapted to cooperate directly with the ratchet wheel, and a spring interposed between the pawl-actuating member and the pawl to yieldingly force the latter toward the ratchet wheel.

In witness that I claim the foregoing I have hereunto subscribed my name this 26th day of May, 1919.

FREDERICK B. TOWNSEND.